United States Patent
Hayashi

(10) Patent No.: US 11,528,715 B2
(45) Date of Patent: *Dec. 13, 2022

(54) WIRELESS COMMUNICATION SYSTEM, BASE STATION, AND COMMUNICATION METHOD

(71) Applicant: NEC Corporation, Tokyo (JP)

(72) Inventor: Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,266

(22) Filed: Jun. 28, 2021

(65) Prior Publication Data
US 2022/0007375 A1 Jan. 6, 2022

Related U.S. Application Data

(63) Continuation of application No. 16/721,286, filed on Dec. 19, 2019, now abandoned, which is a (Continued)

(30) Foreign Application Priority Data

Nov. 7, 2014 (JP) .................. 2014-227379

(51) Int. Cl.
*H04W 72/08* (2009.01)
*H04W 16/32* (2009.01)
(Continued)

(52) U.S. Cl.
CPC ......... *H04W 72/085* (2013.01); *H04W 16/32* (2013.01); *H04W 28/04* (2013.01);
(Continued)

(58) Field of Classification Search
None
See application file for complete search history.

(56) References Cited

U.S. PATENT DOCUMENTS 8,855,047 B2   10/2014   Sammour et al.
10,334,585 B2   6/2019   Vincze et al.
(Continued)

FOREIGN PATENT DOCUMENTS

CN   103959829 A   7/2014
EP    2693817 A1   2/2014
(Continued)

OTHER PUBLICATIONS

Japanese Office Action for JP Application No. 2020-218699 dated Feb. 8, 2022 with English Translation.
(Continued)

*Primary Examiner* — Anh Vu H Ly

(57) ABSTRACT

A wireless communication system of the present invention includes a first base station (30) and a second base station (20) configured to be capable of transmitting downlink data received from a core network to a terminal via the second base station (20) and the first base station (30). The second base station (20) transmits, to the first base station (30), information for identifying downlink data to be discarded from among the downlink data transmitted to the first base station (30) and a command for discarding the downlink data identified by the information. The first base station (30) discards downlink data not transmitted to the terminal from among the downlink data identified by the information.

2 Claims, 13 Drawing Sheets

Related U.S. Application Data continuation of application No. 15/523,532, filed as application No. PCT/JP2015/004372 on Aug. 28, 2015, now Pat. No. 10,548,145.

(51) Int. Cl.

| | | |
|---|---|---|
| *H04W 72/04* | (2009.01) | |
| *H04W 28/04* | (2009.01) | |
| *H04W 92/20* | (2009.01) | |
| *H04W 76/27* | (2018.01) | |
| *H04W 88/06* | (2009.01) | |
| *H04W 88/08* | (2009.01) | |

(52) U.S. Cl.
CPC ......... *H04W 72/04* (2013.01); *H04W 72/042* (2013.01); *H04W 92/20* (2013.01); *H04W 76/27* (2018.02); *H04W 88/06* (2013.01); *H04W 88/08* (2013.01)

(56) References Cited

U.S. PATENT DOCUMENTS

| | | | |
|---|---|---|---|
| 10,548,145 | B2 | 1/2020 | Hayashi |
| 10,764,870 | B2 * | 9/2020 | Yi .................... H04W 72/0413 |
| 2009/0238140 | A1 | 9/2009 | Kojima |
| 2011/0269464 | A1 | 11/2011 | Xu et al. |
| 2014/0098747 | A1 | 4/2014 | Jonsson et al. |
| 2014/0301281 | A1 * | 10/2014 | Koskinen ............ H04L 1/1838 370/329 |
| 2014/0313981 | A1 | 10/2014 | Christoffersson et al. |
| 2015/0043435 | A1 | 2/2015 | Blankenship et al. |
| 2015/0085667 | A1 * | 3/2015 | Sivanesan ............ H04W 88/08 370/237 |
| 2015/0264615 | A1 | 9/2015 | Zhao et al. |
| 2016/0044639 | A1 | 2/2016 | Yi et al. |
| 2016/0065700 | A1 * | 3/2016 | Yi ......................... H04L 69/04 370/328 |
| 2016/0088127 | A1 | 3/2016 | Cai |
| 2016/0164793 | A1 | 6/2016 | Basu Mallick et al. |
| 2016/0249259 | A1 | 8/2016 | Park et al. |
| 2016/0255619 | A1 | 9/2016 | Yi et al. |
| 2016/0255675 | A1 | 9/2016 | Van Lieshout et al. |
| 2016/0302075 | A1 | 10/2016 | Dudda et al. |
| 2016/0345198 | A1 | 11/2016 | Lee et al. |
| 2017/0078918 | A1 * | 3/2017 | He ..................... H04W 28/16 |
| 2017/0085492 | A1 | 3/2017 | Xiao et al. |
| 2017/0086254 | A1 | 3/2017 | Lee et al. |
| 2017/0208501 | A1 | 7/2017 | Lee et al. |
| 2017/0215225 | A1 | 7/2017 | Yi et al. |
| 2017/0245252 | A1 | 8/2017 | Gao et al. |
| 2017/0264562 | A1 | 9/2017 | Yi et al. |
| 2017/0272553 | A1 | 9/2017 | Yi et al. |
| 2018/0123920 | A1 | 5/2018 | Dudda et al. |
| 2018/0176974 | A1 | 6/2018 | Fujishiro et al. |
| 2020/0170021 | A1 | 5/2020 | Hayashi |

FOREIGN PATENT DOCUMENTS

| | | | | |
|---|---|---|---|---|
| EP | 2830352 | A1 | 1/2015 | |
| EP | 3020155 | A1 | 5/2016 | |
| JP | 2009-232031 | A | 10/2009 | |
| WO | WO-2015/021412 | A1 | 2/2015 | |
| WO | WO-2015060544 | A1 * | 4/2015 | ............ H04W 24/08 |
| WO | WO-2015064931 | A1 * | 5/2015 | ............... H04L 1/00 |
| WO | WO-2015119410 | A1 * | 8/2015 | ............ H04L 43/08 |
| WO | WO-2015/139557 | A1 | 9/2015 | |

OTHER PUBLICATIONS

Catt, Considerations on the flow control, 3GPP TSG-RAN WG3 #85 R3-141704, Aug. 18-22, 2014.

3GPP "3rd Generation Partnership Project; Technical Specification Group Radio Access Network; E-UTRAN X2 Interface User Plane Protocol (Release 12)", 3GPP TS 36.4de, V0.0.0, (Aug. 2014), pp. 1-14 (14 pages).

3GPP TS 36.322 V12.0.0 Evolved Universal Terrestrial Radio Access (E-UTRA); Radio Link Control (RLC) protocol specification (Release 12) (Jun. 2014) (36 pages).

Chinese Notification of First Office Action issued in Chinese Patent Application No. 201580060544.X, dated Sep. 12, 2019, 13 pages.

Extended European Search Report issued by the European Patent Office for European Application No. 15857994.6 dated May 24, 2018 (7 pages).

Interntional Search Report corresponding to PCT/JP2015/004372 dated Nov. 17, 2015 (one page).

Japanese Decision to Grant a Patent issued in Japanese Patent Application No. 2018-113425, dated Jul. 30, 2019, 5 pages.

NEC "Transmission of Discard Indication", 3GPP TSG-RAN WG3#86, R3-142804, San Francisco, USA, Nov. 17-21, 2014, 11 pages.

Nokia Networks, Nokia Corporation "PDCP Window Handling for Split Bearers", 3GPP TSG-RAN WG2 Meeting #87, R2-143369 (Revision of R2-142087), Dresden, Germany, Aug. 18-22, 2014, 8 pages.

NTT Docomo, Inc., Mitsubishi Electric, On data forwarding for split bearer, 3GPP TSG-RAN WG3 #85bis R3-142396, Sep. 27, 2014 (5 pages).

India Examination Report issued in Indian Patent Application No. 201717013774, dated Jan. 31, 2020, 5 pages.

Ericsson "E-UTRAN X2 interface user plane protocol updates during RAN3#85bis", 3GPP TSG-RAN WG3 Meeting #85bis, R3-142596, Shanghai, P.R. China, Oct. 6-10, 2014, 1 page.

Japan Notice of Reasons for Refusal issued in Japanese Patent Application No. 2019-155743, dated Nov. 4, 2020, 6 pages.

3GPP "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)" 3GPP TS 36.300 V12.1.0 (Mar. 2014), pp. 1-209.

* cited by examiner

ENTIRE CONFIGURATION OF WIRELESS COMMUNICATION SYSTEM IMPLEMENTING Dual Connectivity CONNECTION CONFIGURATION OF C-plane IN Dual Connectivity

| Bits | | | | | | | | Number of Octets |
|---|---|---|---|---|---|---|---|---|
| 7 | 6 | 5 | 4 | 3 | 2 | 1 | 0 | |
| PDU Type (=0) | | | | GBR/Non-GBR | QCI | Discard | SN | 1 |
| X2-U Sequence Number | | | | | | | | 2 |
| QCI | | | | | | | | 3 |
| Spare extension | | | | | | | | 0-4 |

DL USER DATA (PDU Type 0) Format

| Bits | | | | | | | | Number of Octets |
|---|---|---|---|---|---|---|---|---|
| 7 | 6 | 5 | 4 | 3 | 2 | 1 | 0 | |
| PDU Type (=X-1) | | | | GBR/ Non-GBR | QCI | Discard | SN | 1 |
| X2-U Sequence Number | | | | | | | | 2 |
| QCI | | | | | | | | 3 |
| Spare extension | | | | | | | | 0-4 |

Discard Indication (PDU Type X-1) Format

Fig. 11

| Bits | | | | | | | | Number of Octets |
|---|---|---|---|---|---|---|---|---|
| 7 | 6 | 5 | 4 | 3 | 2 | 1 | 0 | |
| PDU Type (=X1) | | | | Spare | | Discard | SN | 1 |
| X2-U Sequence Number | | | | | | | | 2 |
| Spare extension | | | | | | | | 0-4 |

Discard Indication (PDU Type X1) Format (INDIVIDUAL E-RAB)

Fig. 12

| Bits | | | | | | | | Number of Octets |
|---|---|---|---|---|---|---|---|---|
| 7 | 6 | 5 | 4 | 3 | 2 | 1 | 0 | |
| PDU Type (=XX1) | | | | Spare | | | SN Range | 1 |
| Start X2-U Sequence Number | | | | | | | | 2 |
| End X2-U Sequence Number | | | | | | | | 3 |
| Spare extension | | | | | | | | 0-4 |

Discard Indication (PDU Type XX1) Format (INDIVIDUAL E-RAB)

| Bits | | | | | | | | Number of Octets |
|---|---|---|---|---|---|---|---|---|
| 7 | 6 | 5 | 4 | 3 | 2 | 1 | 0 | |
| PDU Type (=X2) | | | | Spare | | GBR/ Non-GBR | QCI -bit | 1 |
| QCI | | | | | | | | 2 |
| | | | | | | | | |
| | | | | | | | | |
| Spare extension | | | | | | | | 0-4 |

Discard Indication (PDU Type X2) Format (PLURAL E-RABs)

| Bits | | | | | | | | Number of Octets |
|---|---|---|---|---|---|---|---|---|
| 7 | 6 | 5 | 4 | 3 | 2 | 1 | 0 | |
| PDU Type (=Y1) | | | | Spare | | | Discard Result | 1 |
| X2-U Sequence Number#1 | | | | | | | | 2 |
| .... | | | | | | | | |
| X2-U Sequence Number#N | | | | | | | | N+2 |
| Spare extension | | | | | | | | 0~4 |

DL DATA DELIVERY STATUS (PDU Type Y1) Format

Fig. 19

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Spare | | | Lost Packet Report | 1 |
| X2-U Sequence Number#1 | | | | | | | | 2 |
| .... | | | | | | | | |
| X2-U Sequence Number#N | | | | | | | | N+2 |
| Number of lost X2-U Sequence Number ranges reported | | | | | | | | 1 |
| Start of lost X2-U Sequence Number range | | | | | | | | 4* (Number of reported lost X2-u SN ranges) |
| End of lost X2-U Sequence Number range | | | | | | | | |
| Spare extension | | | | | | | | 0-4 |

DL DATA DELIVERY STATUS (PDU Type 1) Format

Fig. 20

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Spare | | SN Type | Lost Packet Report | 1 |
| X2-U Sequence Number#1 | | | | | | | | 2 |
| .... | | | | | | | | |
| X2-U Sequence Number#N | | | | | | | | N+2 |
| Number of lost X2-U Sequence Number ranges reported | | | | | | | | 1 |
| Start of lost X2-U Sequence Number range | | | | | | | | 4* (Number of reported lost X2-u SN ranges) |
| End of lost X2-U Sequence Number range | | | | | | | | |
| Spare extension | | | | | | | | 0-4 |

DL DATA DELIVERY STATUS (PDU Type 1) Format

Fig. 21

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Spare | SN Type | Discard Result | Lost Packet Report | 1 |
| X2-U Sequence Number#1 | | | | | | | | 2 |
| .... | | | | | | | | |
| X2-U Sequence Number#N | | | | | | | | N+2 |
| Number of lost X2-U Sequence Number ranges reported | | | | | | | | 1 |
| Start of lost X2-U Sequence Number range | | | | | | | | 4* (Number of reported lost X2-u SN ranges) |
| End of lost X2-U Sequence Number range | | | | | | | | |
| Spare extension | | | | | | | | 0-4 |

DL DATA DELIVERY STATUS (PDU Type 1) Format

WIRELESS COMMUNICATION SYSTEM, BASE STATION, AND COMMUNICATION METHOD

This application is a continuation of application Ser. No. 16/721,286 filed Dec. 19, 2019 which is a continuation of U.S. patent application Ser. No. 15/523,532 filed on May 1, 2017, (now U.S. Pat. No. 10,548,145) which is a national stage application of International Application No. PCT/JP2015/004372 entitled "Wireless Communication System, Base Station, and Communication Method" filed on Aug. 28, 2015, which claims priority to Japanese Application No. 2014-227379 filed on Nov. 7, 2014, the disclosures of which are hereby incorporated by reference in their entirety.

TECHNICAL FIELD

The present invention relates to a wireless communication system, a base station, and a communication method.

BACKGROUND ART

3GPP (3rd Generation Partnership Project) has been examining an EUTRAN (Evolved UMTS Terrestrial Radio Access Network (UMTS: Universal Mobile Telecommunications System)) network called Dual Connectivity in which packet data is transmitted and received between two eNBs (eNodeBs) and a UE (User Equipment).

FIG. 1 shows an example of a configuration of a wireless communication system that implements Dual Connectivity.

The wireless communication system shown in FIG. 1 includes a UE 10, an MeNodeB (Master eNode B, hereinafter referred to as MeNB) 20, an SeNodeB (Secondary eNode B, hereinafter referred to as SeNB) 30, an MME (Mobility Management Entity) 40, and an S-GW (Serving Gateway) 50.

The MeNB 20 is a second base station that operates cells served by the MeNB 20 (MCG: Master Cell Group).

The SeNB 30 is a first base station that operates to cells served by the SeNB 30 (SCG: Secondary Cell Group). Note that cells served by the SeNB 30 are located within a coverage area of a cell served by the MeNB 20.

The UE 10 is a terminal that receives DL (DownLink) packet data from both the MeNB 20 and the SeNB 30. Note that the UE 10 transmits UL (UpLink) packet data only to the MeNB 20, only to the SeNB 30, or to both the MeNB 20 and SeNB 30.

The MME 40 is a core network device disposed in a CN (Core Network) and performs transmission in the C (Control)-plane and mobile management of the UE 10.

The S-GW 50 is a core network device disposed in the CN and performs transmission of packet data in the U (User)-plane.

Note that the MeNB 20 and SeNB 30 are connected via an X2 Interface. Moreover, the MME 40, the S-GW 50, the MeNB 20, and the SeNB 30 are connected via an S1 Interface.

FIG. 2 shows an example of a connection configuration of the C-plane in Dual Connectivity.

The connection in the C-Plane is shown in FIG. 2. The connection of the UE 10, which is in a connected state of Dual Connectivity, is only S1-MME between the MeNB 20 and the MME 40. Further, the RRC (Radio Resource Control) Connection of the UE 10 is present only in a wireless section between the UE 10 and the MeNB 20. That is, there is no RRC Connection at least in a wireless section between the UE 10 and the SeNB 30. However, the SeNB 30 may create signal information related to an RRC message for the UE 10 and transmit the created signal information to the UE 10 via the MeNB 20.

Further, an example of the connection configuration of the U-plane in Dual Connectivity is the Split bearer option configuration.

FIG. 3 shows an example of a connection configuration of the U-plane in the case of the Split bearer option configuration. FIG. 4 shows an example of a connection configuration of Radio Protocol in the case of the Split bearer option configuration.

As shown in FIGS. 3 and 4, in the case of the Split bearer option configuration, DL packet data of the U-plane is transmitted from the S-GW 50 to only the MeNB 20 and not from the S-GW 50 to the SeNB 30. Note that in the configurations of FIGS. 3 and 4, a bearer from the MeNB 20 to the UE 10 is referred to as an MCG bearer, and a bearer from the SeNB 30 to the UE 10 is referred to as an SCG bearer.

As shown in FIG. 4, the UE 10, MeNB 20, and SeNB 30 are each composed of a PDCP (Packet Data Convergence Protocol) layer(s), an RLC (Radio Link Control) layer(s), and a MAC (Medium Access Control) layer(s). Note that the specification of the RLC layer is described in Non Patent Literature 1 (3GPP TS 36.322 V12.0.0).

In the MeNB 20, the DL packet data of the U-plane received from the S-GW 50 is received by the PDCP layers. In this example, one of the PDCP layers of the MeNB 20 (right layer in FIG. 4) can transmit some packet data (PDCP PDUs (Protocol Data Units)) to the UE 10 via a cell served by the MeNB 20 and can transmit some packet data (PDCP PDUs) to the UE 10 via the SeNB 30. That is, the PDCP layers of the MeNB 20 can split the packet data of the U-plane.

CITATION LIST

Non Patent Literature

Non Patent Literature 1: 3GPP TS 36.322 V12.0.0 (2014-06)

SUMMARY OF INVENTION

Technical Problem

However, for example, like the Split bearer option configuration, in a configuration in which the second base station (MeNB) can transmit the downlink data received from the CN to the terminal (UE) via the second base station (cell served by the second base station) and the first base station (SeNB), there is the following problem.

When the second base station transmits the downlink data received from the CN to the terminal via the first base station, the second base station transmits the downlink data to the first base station and then instructs the first base station to transmit the downlink data to the terminal.

After that, the second base station may have to instruct the first base station to discard the downlink data, which has already been transmitted to the first base station, due to some kind of internal circumstances (e.g., internal error).

However, although 3GPP specifies the concept of discarding data, 3GPP does not specify specific means for discarding data. For this reason, there has been a problem that the first base station cannot discard the downlink data.

Thus, one of objects to be attained by exemplary embodiments disclosed in the present specification is to provide a wireless communication system, a base station, and a communication method that can solve the above-described problem. Note that this object is only one of the objects to be attained by the illustrative embodiments disclosed herein. The other objects or problems and novel features will be made apparent from the following description and the accompanying drawings.

Solution to Problem

A wireless communication system of the present invention includes:

a first base station; and a second base station configured to be capable of transmitting downlink data received from a core network to a terminal via the second base station and the first base station, wherein the second base station transmits, to the first base station, information for identifying downlink data to be discarded from among the downlink data transmitted to the first base station and a command for discarding the downlink data identified by the information, and the first base station discards downlink data not transmitted to the terminal from among the downlink data identified by the information.

A first base station of the present invention configured to be capable of transmitting downlink data received from a core network to a terminal via the base station and an other base station, the base station including a communication unit configured to transmit, to the other base station, information for identifying downlink data to be discarded from among the downlink data transmitted to the other base station and a command for discarding the downlink data identified by the information.

A second base station of the present invention configured to be capable of receiving, from an other base station, downlink data received by the other base station from a core network and to be capable of transmitting the downlink data to a terminal, the base station including:

a communication unit configured to receive, from the other base station, information for identifying downlink data to be discarded from among the downlink data transmitted from the other base station to the base station and a command for discarding the downlink data identified by the information; and a control unit configured to discard downlink data not transmitted to the terminal from among the downlink data identified by the information.

A first communication method of the present invention performed by a base station configured to be capable of transmitting downlink data received from a core network to a terminal via the base station and an other base station, the communication method including transmitting, to the other base station, information for identifying downlink data to be discarded from among the downlink data transmitted to the other base station and a command for discarding the downlink data identified by the information.

A second communication method of the present invention performed by a base station configured to be capable of receiving, from an other base station, downlink data received by the other base station from a core network and to be capable of transmitting the downlink data to a terminal, the communication method including:

receiving, from the other base station, information for identifying downlink data to be discarded from among the downlink data transmitted from the other base station to the base station and a command for discarding the downlink data identified by the information; and discarding downlink data not transmitted to the terminal from among the downlink data identified by the information.

Advantageous Effects of Invention

According to the present invention, it is possible to achieve an exemplary advantage in which downlink data received from a core network via a second base station can be discarded by a first base station.

BRIEF DESCRIPTION OF DRAWINGS

FIG. 11 is a drawing showing an example of a format of Discard Indication according to the first exemplary embodiment of the present invention;

FIG. 12 is a drawing showing an example of a format of Discard Indication according to the first exemplary embodiment of the present invention;

FIG. 19 is a drawing showing an example of a format of DL DATA DELIVERY STATUS according to the fifth exemplary embodiment of the present invention;

FIG. 20 is a drawing showing an example of a format of DL DATA DELIVERY STATUS according to the fifth exemplary embodiment of the present invention; and FIG. 21 is a drawing showing an example of a format of DL DATA DELIVERY STATUS according to the fifth exemplary embodiment of the present invention.

DESCRIPTION OF EMBODIMENTS

Hereinafter, exemplary embodiments for carrying out the present invention will be described with reference to the drawings.

(1) First Exemplary Embodiment (1-1) Outline of First Exemplary Embodiment

Figure 1:
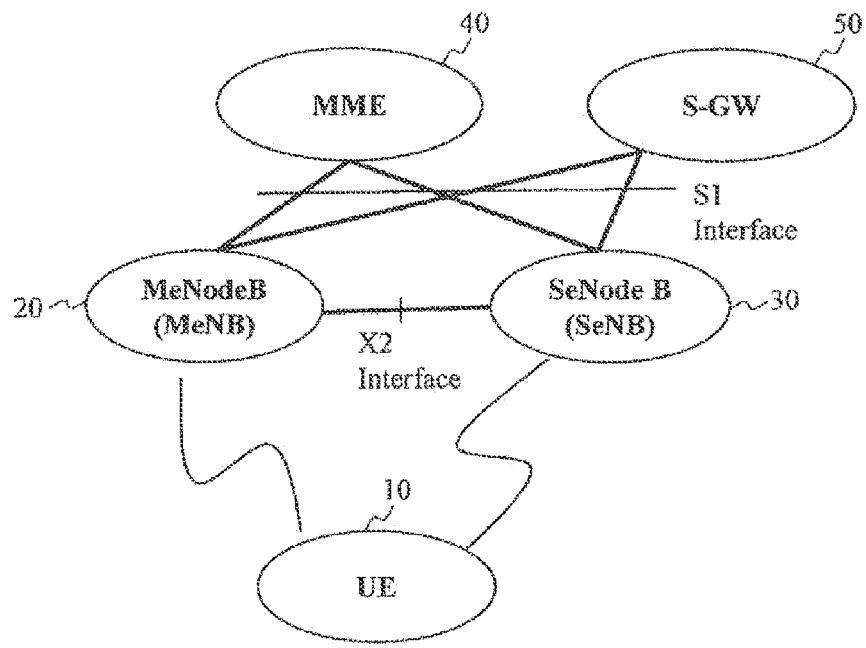
FIG. 1 is a drawing showing an example of an entire configuration of a wireless communication system that implements Dual Connectivity.
Figure 2:
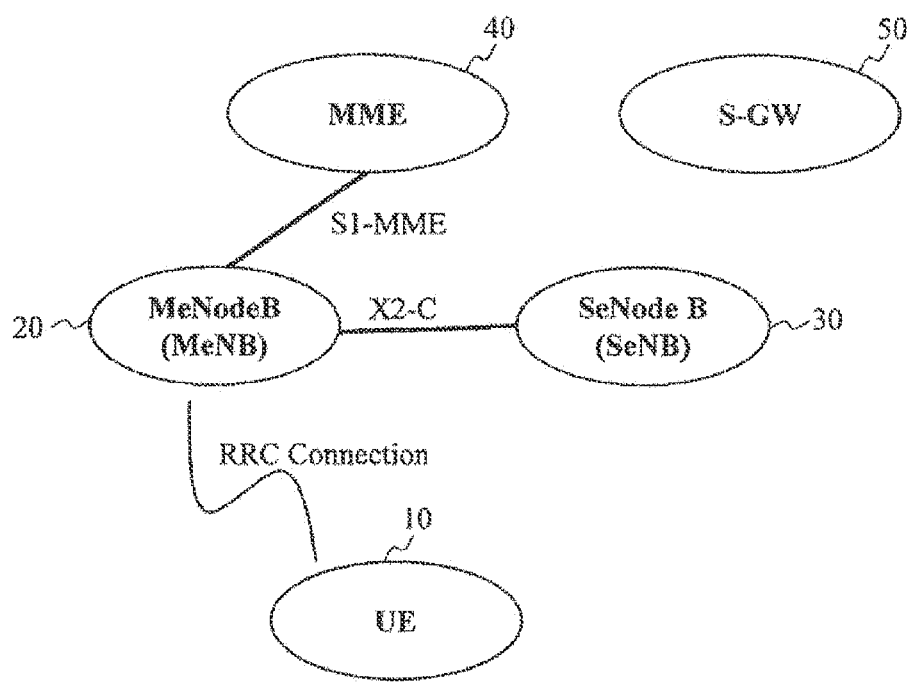
FIG. 2 is a drawing showing an example of a connection configuration of the C-plane in Dual Connectivity.
Figure 3:
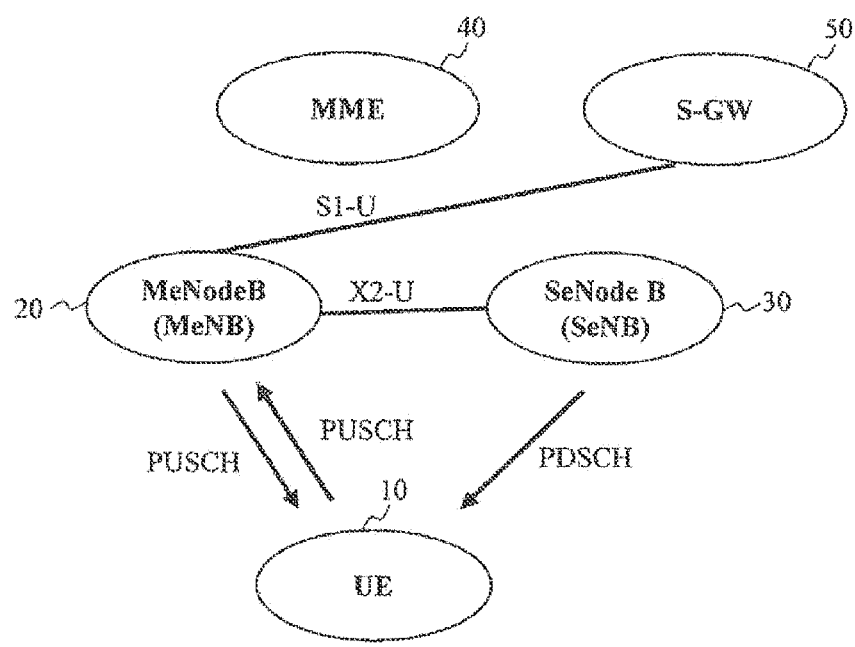
FIG. 3 is a drawing showing an example (Split bearer option) of a connection configuration of the U-plane in Dual Connectivity.
Figure 4:
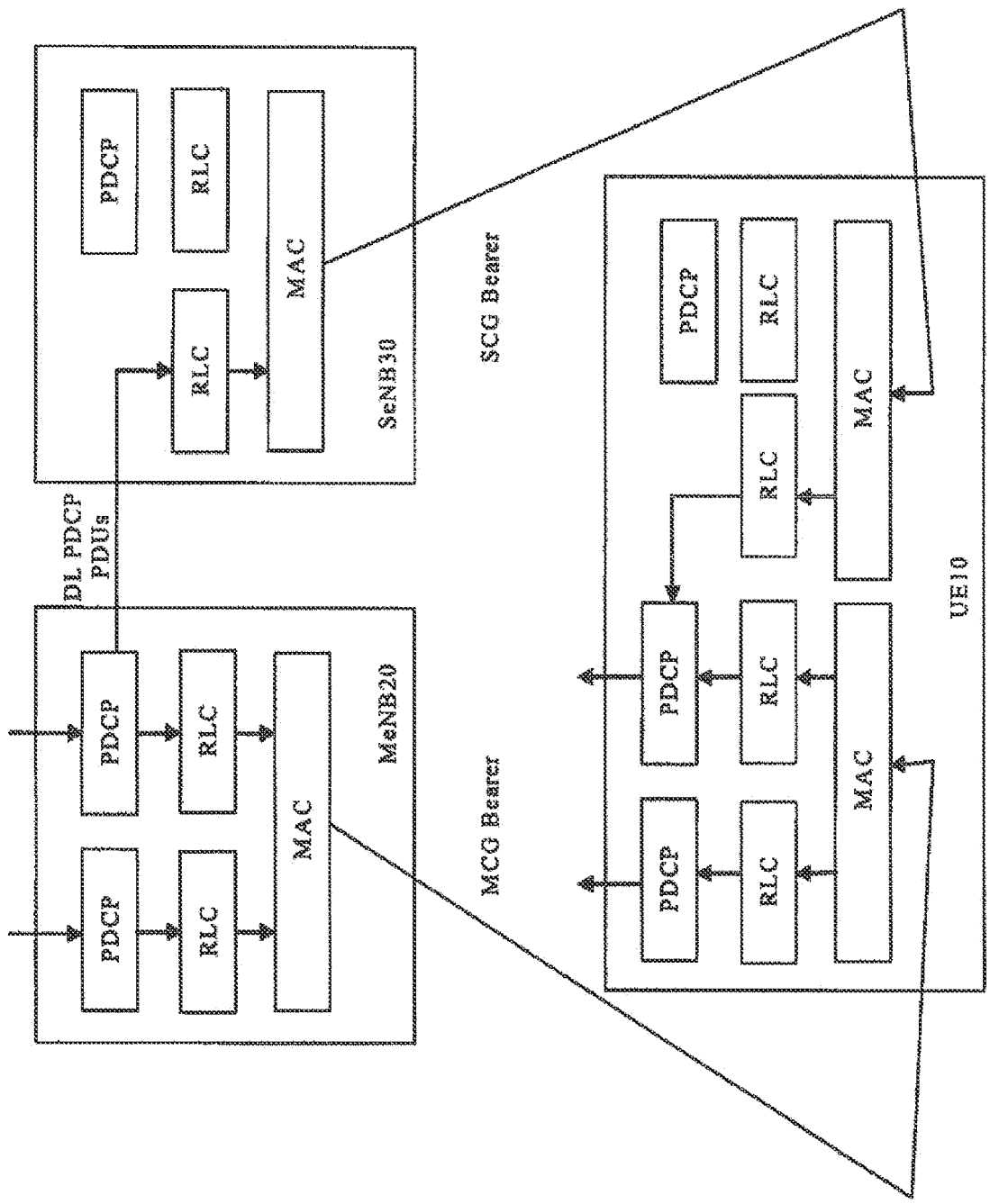
FIG. 4 is a drawing showing an example (Split bearer option) of a connection configuration of Radio Protocol in Dual Connectivity.

In this exemplary embodiment, an entire configuration of a wireless communication system is the same as the one shown in FIG. 1 except that the MeNB 20 and SeNB 30 each have a new function.

Hereinafter, the configurations of the MeNB 20 and SeNB 30 will be described in detail.

The SeNB 30 is a first base station.

The MeNB 20 is a second base station that configures Dual Connectivity and can transmit downlink data received from a CN to a UE 10 via the MeNB 20 (cell served by MeNB 20) and SeNB 30.

Figure 5:
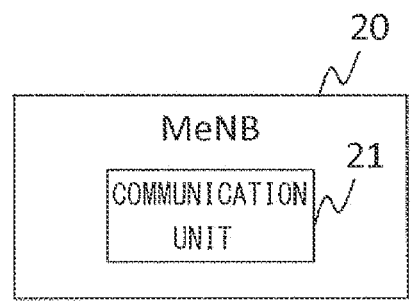
FIG. 5 is a block diagram showing an example of a configuration of an MeNB according to a first exemplary embodiment of the present invention.

FIG. 5 shows an example of a configuration of the MeNB 20 according to this exemplary embodiment.

As shown in FIG. 5, the MeNB 20 of this exemplary embodiment includes a communication unit 21.

The communication unit 21 transmits, to the SeNB 30, information for specifying downlink data to be discarded from the downlink data that has been transmitted to the SeNB 30 and a command for discarding the downlink data specified by the information. Note that as will be described later, a new information element (in the example which will be described later, it is the information element Discard shown in FIG. 8) may be provided as the command for discarding the downlink data. Alternatively, the information transmitted from the MeNB 20 to the SeNB 30 itself may be the command for discarding the downlink data.

Note that the MeNB 20 includes a control unit for performing processes other than communication processing performed by the communication unit 21. However, the control unit is not shown in FIG. 5.

Figure 6:
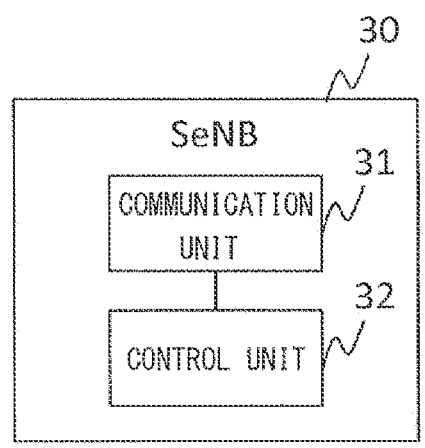
FIG. 6 is a block diagram showing an example of a configuration of an SeNB according to a first exemplary embodiment of the present invention.

FIG. 6 shows an example of a configuration of the SeNB 30 according to this exemplary embodiment.

As shown in FIG. 6, the SeNB 30 according to this exemplary embodiment includes a communication unit 31 and a control unit 32.

The communication unit 31 receives, from the MeNB 20, the information for specifying the downlink data to be discarded from among the downlink data transmitted from the MeNB 20 to the SeNB 30 and the command for discarding the downlink data specified by the information.

The control unit 32 performs processes other than the communication processing performed by the communication unit 31.

For example, the control unit 32 discards downlink data that has not been transmitted to the UE 10 and remains in a transmission buffer from among the downlink data specified by the above information transmitted from the MeNB 20.

Further, the communication unit 31 transmits the information for identifying the downlink data, which has been discarded by the control unit 32, to the MeNB 20. Note that the information transmitted by the communication unit 31 to the MeNB 20 for identifying the downlink data, which has been discarded by the control unit 32, may be the information indicating individual pieces of the downlink data, which has been discarded by the control unit 32, or the information that does not indicate individual pieces of the discarded downlink data but instead indicates that all the downlink data that should be discarded, which is described in the information received by the communication unit 31 from the MeNB 20, has been discarded.

As described above, in this exemplary embodiment, the MeNB 20 transmits, to the SeNB 30, the information for specifying the downlink data to be discarded from among the downlink data transmitted to the SeNB 30 and the command for discarding the downlink data specified by the information. In response, the SeNB 30 discards the downlink data, which has not been transmitted to the UE 10, from among the downlink data specified by the above information.

Accordingly, as the SeNB 30 can specify and discard the downlink data to be discarded, this exemplary embodiment achieves an exemplary advantage that the downlink data can be discarded by the SeNB 30.

(1-2) Details of First Exemplary Embodiment (1-2-1) Cases where a Discard Command is Transmitted There are the following cases when the MeNB 20 transmits the command for instructing the SeNB 30 to discard the downlink data.

The MeNB 20 has not received Acknowledge for a PDCP PDU(s) (downlink data), which has been transmitted to the SeNB 30, after a certain period of time An internal error has occurred in the MeNB 20

Immediately after the MeNB 20 transmitted a PDCP PDU(s) to the SeNB 30 or within a first period after the MeNB 20 transmitted the PDCP PDU(s), the MeNB 20 receives an E-RAB (EUTRAN-Radio Access Bearer) release command from the MME 40 in the CN Immediately after the MeNB 20 transmitted a PDCP PDU(s) to the SeNB 30 or within a second period after the MeNB 20 transmitted the PDCP PDU(s), some kind of error (link error, error in which the MeNB 20 receives Reset from the MME 40) between the MeNB 20 and the MME 40 or S-GW 50 in the CN has occurred Note that the first and second periods may be measured by a timer.

(1-2-2) Content of Discard Command

There are the following four types, (A) to (D), of content of the command for instructing the SeNB 30 to discard the downlink data, which is transmitted from the MeNB 20 to the SeNB 30.

(A) Command for Discarding all PDCP PDUs

The MeNB 20 can instruct the SeNB 30 to discard all the PDCP PDUs that have been transmitted to the SeNB 30.

For example, suppose that the MeNB 20 has already transmitted PDCP PDU #3, PDCP PDU #4, and PDCP PDU #5 to the SeNB 30.

After that, the MeNB 20 does not specify the PDCP PDUs by their Sequence Numbers or the like but instead transmits a one-bit discard command to the SeNB 30.

Then the SeNB 30 discards all of the PDCP PDUs remaining in the transmission buffer from among the PDCP PDU #3, PDCP PDU #4, and PDCP PDU #5.

The SeNB 30 returns the Sequence Number(s) of the discarded PDCP PDU(s) to the MeNB 20.

Thus, the MeNB 20 can recognize the Sequence Number(s) of the PDCP PDU(s) discarded by the SeNB 30. Therefore, the MeNB 20 can retransmit the PDCP PDU(s) discarded by the SeNB 30 in order of the Sequence Number of the PDCP PDU from a cell served by the MeNB 20 to the UE 10.

In the above example, suppose that, for example, the SeNB 30 has already transmitted the PDCP PDU #3 to the UE 10 when the SeNB 30 received the discard command from the MeNB 20, and the PDCP PDU #4 and PDCP PDU #5 still remain in the transmission buffer. In this state, the SeNB 30 discards the PDCP PDU #4 and PDCP PDU #5 and returns the Sequence Numbers of the discarded PDCP PDU #4 and PDCP PDU #5 to the MeNB 20.

Note that the above discard command transmitted by the MeNB 20 specifies an individual E-RAB, and the discard is performed for each E-RAB.

(B) Discard Command Using Sequence Number

The MeNB 20 can instruct the SeNB 30 to discard a PDCP PDU(s) having a certain Sequence Number(s).

For example, suppose that the MeNB 20 has already transmitted the PDCP PDU #3, PDCP PDU #4, and PDCP PDU #5 to the SeNB 30. Moreover, the MeNB 20 has received, from the SeNB 30, Acknowledge for the PDCP PDU #3 and PDCP PDU #5 but not for PDCP PDU #4.

In this case, the MeNB 20 specifies the Sequence Number of the PDCP PDU #4 and transmits a discard command to the SeNB 30.

Then, if the specified PDCP PDU #4 still remains in the transmission buffer, the SeNB 30 discards the PDCP PDU #4.

The SeNB 30 returns the Sequence Number of the discarded PDCP PDU #4 to the MeNB 20.

Thus, as the MeNB 20 can recognize that the SeNB 30 has discarded the PDCP PDU #4, the PDCP PDU #4 can be retransmitted from the cell served by the MeNB 20 to the UE 10.

Note that the above discard command transmitted by the MeNB 20 specifies an individual E-RAB, and the discard is performed for each E-RAB.

The above discard command transmitted by the MeNB 20 may specify an individual Sequence Number(s), specify a range of the Sequence Numbers (start number and end number), or specify a certain Sequence Number (start number) in order to specify all the Sequence numbers following the certain Sequence Number. Note that the range of the Sequence Numbers may be specified, as described above, by the start number and the end number or by the start number and the number (range) of the PDCP PDUs, which should be discarded, counting from the start number. An example of the start number and that of the number of the PDCP PDUs, which should be discarded, counting from the start number are, respectively, the PDCP PDU #3 and ten. In this case, the PDCP PDUs from the PDCP PDU #3 to the tenth PDCP PDU counting from the PDCP PDU #3 are discarded.

Moreover, the information specifying the individual Sequence Numbers may be combined with the information specifying the range of the Sequence Numbers in one format.

(C) Discard Command Using QoS (Quality of Service) or QCI (QoS Class Identifier)

The MeNB 20 can instruct the SeNB 30 to discard a PDCP-PDU(s) of a certain QoS or QCI.

For example, suppose that the MeNB 20 has already transmitted, to the SeNB 30, PDCP-PDU #100, PDCP-PDU #101, and PDCP-PDU #102 for E-RAB #1, PDCP-PDU #200, PDCP-PDU #201, and PDCP-PDU #202 for E-RAB #2, and PDCP-PDU #300, PDCP-PDU #301, and PDCP-PDU #303 for E-RAB #3. Further, suppose that the E-RAB #1 and E-RAB #2 are QCI #6, and E-RAB #3 is QCI #1.

In this state, the MeNB 20 specifies the QCI #6 as a QCI of PDCP-PDUs and transmits a discard command to the SeNB 30.

Then, the SeNB 30 discards the PDCP PDU(s) remaining in the transmission buffer from among the PDCP-PDUs for the E-RAB #1 and E-RAB #2, which are the QCI #6, and does not discard the PDCP-PDUs for the E-RAB #3, which is the QCI #1.

Note that the above discard command transmitted by the MeNB 20 does not specify an individual E-RAB, and the discard is performed for all the E-RAB s.

(D) Discard Command Using GBR (Guarantee Bit Rate) or Non-GBR

The MeNB 20 can make a discard command in the form of GBR or Non-GBR instead of the above QoS or QCI described in (C).

For example, suppose that the MeNB 20 has already transmitted, to the SeNB 30, PDCP-PDU #100, PDCP-PDU #101, and PDCP-PDU #102 for E-RAB #1, PDCP-PDU #200, PDCP-PDU #201, and PDCP-PDU #202 for E-RAB #2, and PDCP-PDU #300, PDCP-PDU #301, and PDCP-PDU #303 for E-RAB #3. Further, the E-RAB #1 and E-RAB #2 are Non-GBR and the E-RAB #3 is GBR.

In this state, the MeNB 20 specifies Non-GBR and transmits a discard command to the SeNB 30.

Then, the SeNB 30 discards the PDCP PDU(s) remaining in the transmission buffer from among the PDCP-PDUs for the E-RAB #1 and E-RAB #2, which are the Non-GBR, and does not discard the PDCP-PDUs for the E-RAB #3, which is the GBR.

Note that the above discard command transmitted by the MeNB 20 does not specify an individual E-RAB, and the discard is performed for all the E-RABs.

As described above, in the above-described (C) and (D), as the E-RABs are not individually specified, and one signal message can be a discard command, the command can be promptly made. Moreover, as the SeNB 30 can discard the PDCP-PDU(s) remaining in the transmission buffer from among the PDCP-PDU for the E-RAB #1 and E-RAB #2 by one signal message, no influence is exerted on the transmission of the PDCP-PDUs for the E-RAB #3.

(1-2-3) Signal Message for Discard Command

The MeNB 20 can transmit a discard command to the SeNB 30 using a signal message. There are the following two possible signal messages, (a) and (b).

(A) DL User Data

Figures 7, 8:
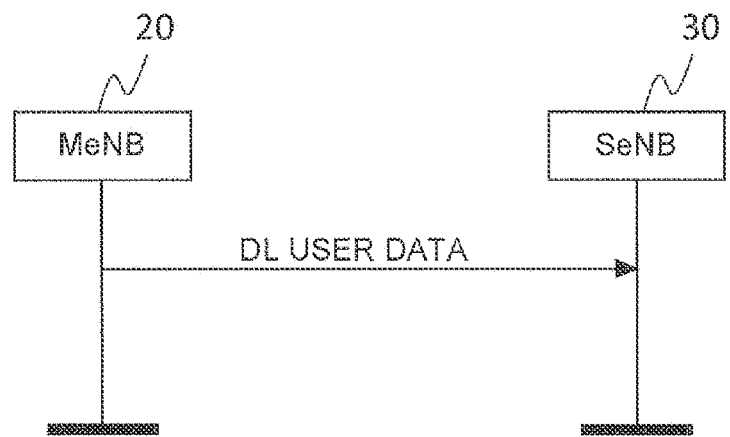
FIG. 7 is a sequence diagram showing an example of an operation for transmitting DL USER DATA from the MeNB to the SeNB according to the first exemplary embodiment of the present invention.
FIG. 8 is a drawing showing an example of a format of the DL USER DATA according to the first exemplary embodiment of the present invention.

As shown in FIG. 7, the MeNB 20 can transmit a discard command to the SeNB 30 using DL USER DATA.

FIG. 8 shows an example of a format of the DL USER DATA.

In the example of FIG. 8, in Discard of Octet1, 0 indicates no discard, while 1 indicates discard.

Further, in SN of Octet1, 0 indicates that a Sequence Number is invalid, while 1 indicates that the Sequence Number is valid. If, in Octet1, Discard is 1 and SN is 1, it indicates a command instructing that a PDCP PDU specified by the Sequence Number in Octet2 is to be discarded. Note that if Discard is 0 (indicating no discard), SN may be blank.

Further, if Discard is 0 (indicating no discard), and SN is 1 (indicating that a Sequence Number is valid), information indicated by Discard may be preferentially applied, and the PDCP PDU specified by the Sequence Number of Octet2 may not be discarded.

Further, in QCI-bit of Octet1, 0 indicates that QCI is invalid, while 1 indicates that QCI is valid. If, in Octet1, Discard is 1 and QCI-bit is 1, it indicates a command instructing that a PDCP PDU(s) specified by the Sequence Number in QCI of Octet3 is to be discarded.

Further, in GBR/Non-GBR of Octet1, 0 indicates GBR, while 1 indicates Non-GBR. If Discard of Octet1 is 1, it indicates a command instructing that a PDCP PDU(s) specified by GBR/Non-GBR is to be discarded.

Note that in Discard of Octet1, 1 may indicate no discard, while 0 may indicates discard.

Further, in SN of Octet1, 1 may indicate that a Sequence Number is invalid, while 0 may indicate that the Sequence Number is valid.

Further, in QCI-bit of Octet1, 1 may indicate that QCI is invalid, while 0 may indicate that QCI is valid.

Moreover, in GBR/Non-GBR of Octet1, 1 may indicate GBR, while 0 may indicate Non-GBR.

(b) Discard Indication

Figures 9, 10:
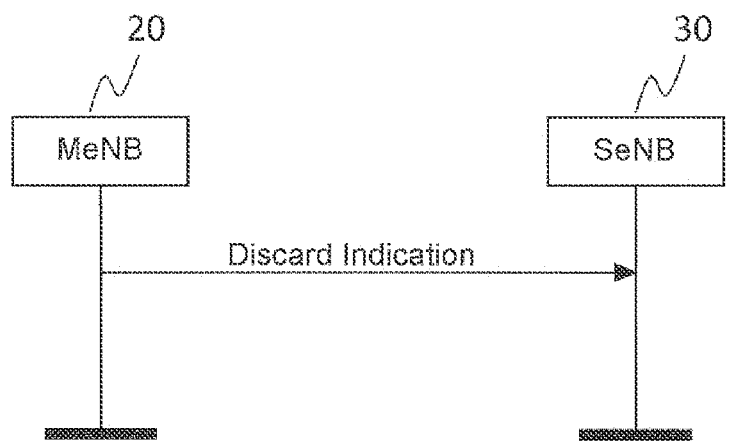
FIG. 9 is a sequence diagram showing an example of an operation for transmitting Discard Indication from the MeNB to the SeNB according to the first exemplary embodiment of the present invention.
FIG. 10 is a drawing showing an example of a format of Discard Indication according to the first exemplary embodiment of the present invention.

As shown in FIG. 9, the MeNB 20 can transmit a discard command to the SeNB 30 using Discard Indication.

FIGS. 10 to 13 show examples of a format of the Discard Indication.

The example shown in FIG. 10 is the same as the one shown in FIG. 8.

In the example shown in FIG. 11, an individual E-RAB is specified to specify a PDCP PDU(s), which is to be discarded, by a Sequence Number(s). In the example of FIG. 11, an individual Sequence Number of a PDCP PDU, which is to be discarded, is specified in Octet2.

In the example of FIG. 12, an individual E-RAB is specified to specify PDCP PDUs, which are to be discarded, by Sequence Numbers. In the example shown in FIG. 12, as a range of the Sequence Numbers are specified by, a start number is specified in Octet2, and an end number is specified in Octet3. Note that in the example shown in FIG. 12, the transmission of the Discard Indication itself indicates a discard command, and thus Discard is not present in Octet1.

Figures 13, 14:
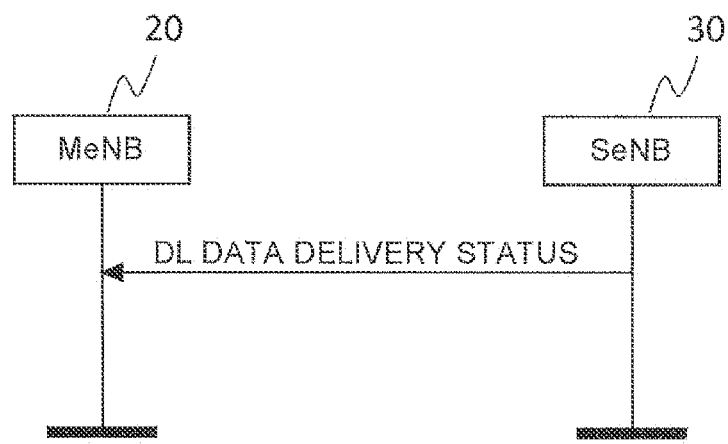
FIG. 13 is a drawing showing an example of a format of Discard Indication according to the first exemplary embodiment of the present invention.
FIG. 14 is a sequence diagram showing an example of an operation for transmitting DL DATA DELIVERY STATUS from the SeNB to the MeNB according to the first exemplary embodiment of the present invention.

In the example shown in FIG. 13, an individual E-RAB is not specified, and a PDCP PDU(s), which is to be discarded, is specified by QCI or GBR/Non-GBR.

(1-2-3) Signal Message for Transmitting Discard Result

As shown in FIG. 14, the SeNB 30 notifies the MeNB 20 of the Sequence Number(s) of the discarded PDCP PDU(s) by DL DATA DELIVERY STATUS.

Figures 15, 16:
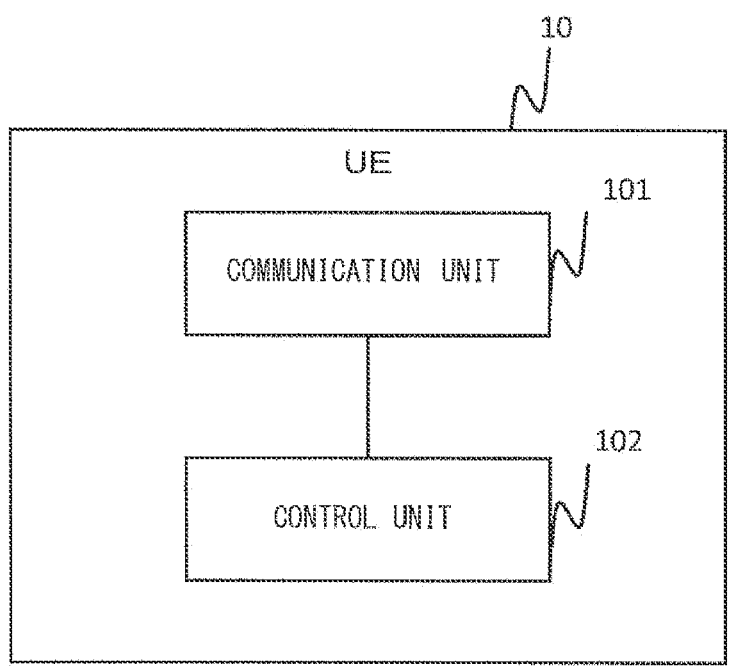
FIG. 15 is a drawing showing an example of a format of DL DATA DELIVERY STATUS according to the first exemplary embodiment of the present invention.
FIG. 16 is a block diagram showing an example of a configuration of a UE according to a third exemplary embodiment of the present invention.

FIG. 15 shows an example of a format of the DL DATA DELIVERY STATUS.

In the example of FIG. 15, in Discard Result of Octet1, 0 indicates invalid, while 1 indicates valid. If Discard Result in Octet1 is 1, it indicates that PDCP PDUs identified by the Sequence Numbers indicated by Octet2 to N+2 have been discarded. Alternatively, if Discard Result of Octet1 is 0, it indicates that the PDCP PDUs identified by the Sequence Numbers indicated by Octet2 to N+2 have not been discarded. One of exemplary advantages achieved by this exemplary embodiment is that a wireless resource of the SeNB 30 can be saved because wireless transmission of PDCP PDU(s), which do not need to be transmitted, will not be performed.

(2) Second Exemplary Embodiment

In the first exemplary embodiment, the MeNB 30 directly transmits the discard command to the SeNB 30.

On the other hand, in this exemplary embodiment, the discard command is firstly transmitted from the MeNB 20 to the UE 10, and then transmitted from the UE 10 to the SeNB 30.

For example, suppose that the MeNB 20 has already transmitted the PDCP PDU #4 to the SeNB 30 and wants the SeNB 30 to discard the PDCP PDU #4.

In this case, the MeNB 20 notifies the UE 10 that it wants the SeNB 30 to discard the PDCP PDU #4, and then the UE 10 transmits the command for discarding the PDCP PDU #4 to the SeNB 30.

Alternatively, the MeNB 20 transmits the PDCP PDU #4 from a cell served by the MeNB 20 to the UE 10 and also instructs the UE 10 to transmit a command for discarding the PDCP PDU #4 to the SeNB 30. Then the UE 10 transmits the command for discarding the PDCP PDU #4 to the SeNB 30.

Note that in this exemplary embodiment, the UE 10 includes a communication unit that communicates with the MeNB 20 and the SeNB 30 and a control unit that performs processes other than communication processing performed by the communication unit.

This exemplary embodiment can solve the following problem.

Assume that, for some reason, the same information is transmitted from both the MeNB 20 and the SeNB 30. There is a problem that the information overlaps when the UE receives the same information from both of these base stations. In order to solve this problem, in this exemplary embodiment, the discard command transmitted from the MeNB 20 to the UE 10 is transmitted from the UE 10 to the SeNB 30, so that the SeNB 30 can discard the downlink data that should be discarded.

(3) Third Exemplary Embodiment

In this exemplary embodiment, the MeNB 20 transmits, for example, the PDCP PDU #4 from a cell served by the MeNB 20 to the UE 10. Immediately after reception of the PDCP PDU #4 from the MeNB 20 or within a third period from the reception of the PDCP PDU #4, if the UE 10 receives the PDCP PDU #4, which is the same PDCP PDU as the one received from the MeNB 20, from the SeNB 30, the UE 10 discards the PDCP PDU #4 received from the SeNB 30. That is, if the UE 10 receives the same PDCP PDU from both the MeNB 20 and SeNB 30, the UE 10 discards the PDCP PDU received later. Note that the UE 10 may instead discard the PDCP PDU received earlier.

FIG. 16 shows a configuration of the UE 10 according to this exemplary embodiment.

As shown in FIG. 16, the UE 10 of this exemplary embodiment includes a communication unit 101 and a control unit 102.

The communication unit 101 communicates with the MeNB 20 and SeNB 30.

Immediately after the reception of the PDCP PDU #4 from the MeNB 20 or within the third period from the reception of the PDCP PDU #4, if the communication unit 101 receives the PDCP PDU #4, which is the same PDCP PDU as the one received from the MeNB 20, from the SeNB 30, the control unit 102 discards the PDCP PDU #4 received from the SeNB 30.

Further, when the UE 10 discards a PDCP PDU, the UE 10 may notify the MeNB 20 or SeNB 30 of a Sequence Number of the discarded PDCP PDU.

This exemplary embodiment can solve the following problem. For example, when a UE receives the same information from the SeNB after the UE receives the information from the MeNB, the UE may operate based on the information received from the MeNB first, and then operate based on the information received from the SeNB later. Operations based on the same information are one of the causes of a processing error being generated in the UE, which is not preferable. In this exemplary embodiment, the UE 10 discards the same information in order to prevent information from overlapping.

(4) Fourth Exemplary Embodiment

In this exemplary embodiment, the SeNB 30 transmits information for identifying downlink data, which has been discarded by the SeNB 30, to the MeNB 20.

Figure 17:
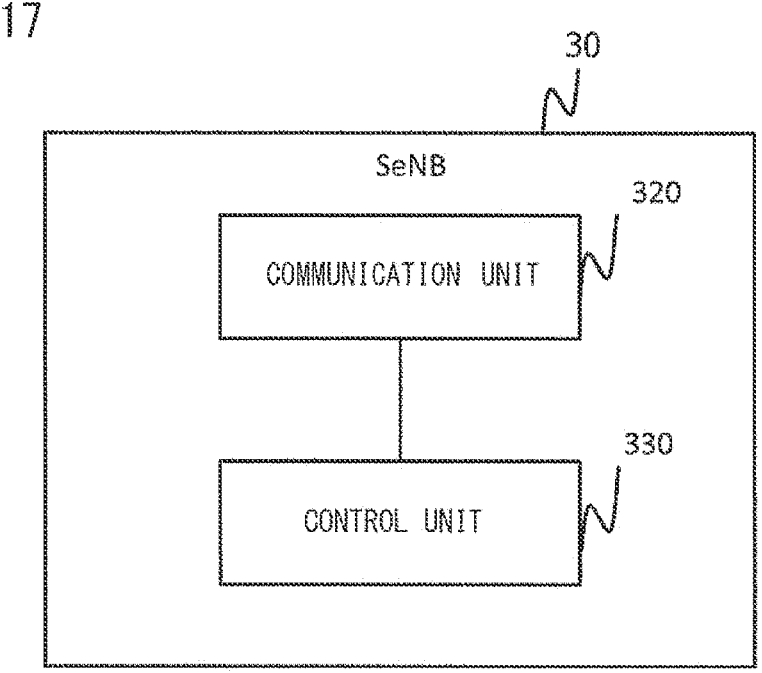
FIG. 17 is a block diagram showing an example of a configuration of an SeNB according to a fourth exemplary embodiment of the present invention.

FIG. 17 shows an example of a configuration of the SeNB 30 of this exemplary embodiment.

As shown in FIG. 17, the SeNB 30 of this exemplary embodiment includes a communication unit 320 and a control unit 330.

The communication unit 320 communicates with the MeNB 20.

For example, the communication unit 320 transmits information for identifying downlink data, which has been discarded by the control unit 330, to the MeNB 20. Note that the communication unit 320 may transmit the information for identifying the discarded downlink data by the above-described DL DATA DELIVERY STATUS (see FIGS. 14 and 15).

The control unit 330 discards the downlink data. An example of a case in which the control unit 330 discards the downlink data is when an internal error has occurred in the SeNB 30.

Note that the MeNB 20 can receive the information for identifying the downlink data, which has been discarded by the control unit 330, from the communication unit 320 included in the SeNB 30.

When the MeNB 20 receives the information from the SeNB 30, the MeNB 20 may transmit a PDCP PDU(s) identified by the information to the SeNB 30 or may transmit a PDCP PDU(s) identified by the information to the UE.

This exemplary embodiment can solve the following problem. For example, in related art, there has been no way for an SeNB to notify an MeNB that the SeNB has intentionally discarded a PDCP PDU(s). For this reason, the MeNB has been unable to know whether the SeNB has intentionally discarded the PDCP PDU(s) or the SeNB has transmitted the PDCP PDU(s) to the UE but the UE has not transmitted Ack to the SeNB, or the SeNB has lost the PDCP PDU(s). In this exemplary embodiment, the SeNB 30 can transmit the information for identifying the downlink data, which has been intentionally discarded by the SeNB 30, to the MeNB 20. The MeNB 20, which has received the information, can know the Sequence Number(s) of the downlink data, which has been intentionally discarded by the SeNB 30.

(5) Fifth Exemplary Embodiment

In this exemplary embodiment, when the SeNB 30 transmits information for identifying downlink data, which has been lost by the SeNB 30, the SeNB 30 distinguishes whether the lost downlink data is consecutive or non-consecutive, and then transmits the information for identifying the lost downlink data.

Figure 18:
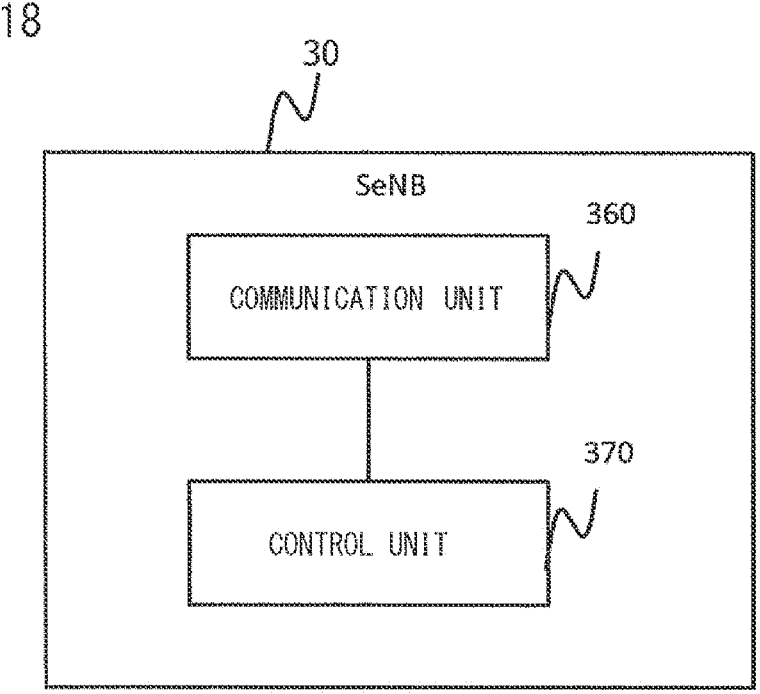
FIG. 18 is a block diagram showing an example of a configuration of an SeNB according to a fifth exemplary embodiment of the present invention.

FIG. 18 shows an example of a configuration of the SeNB 30 of this exemplary embodiment.

As shown in FIG. 18, the SeNB 30 of this exemplary embodiment includes a communication unit 360 and a control unit 370.

The communication unit 360 communicates with the MeNB 20.

For example, the communication unit 360 transmits information for identifying downlink data, which has been lost by the SeNB 30, to the MeNB 20.

As shown in FIG. 14, the SeNB 30 transmits the information for identifying the downlink data, which has been lost by the SeNB 30, to the MeNB 20 by DL DATA DELIVERY STATUS.

FIG. 19 shows an example of a format of the DL DATA DELIVERY STATUS.

In the example of FIG. 19, in Lost Packet Report of Octet1, 1 indicates that PDCP PDUs identified by the Sequence Numbers described from X2-U Sequence Number #1 to X2-U Sequence Number #N indicated by Octet2 to N+2 have been lost, and that PDCP PDUs identified by Number of lost X2-U Sequence Number ranges reported, Start of lost X2-U Sequence Number range, and End of lost X2-U Sequence Number range have been lost.

One X2-U Sequence Number #N (N is a natural number) indicates one PDCP PDU. That is, the X2-U Sequence Number #N can identify an individual PDCP PDU. Accordingly, PDCP PDUs identified by non-consecutive Sequence Numbers can be identified by specifying a lost PDCP PDU using the X2-U Sequence Number #N.

On the other hand, PDCP PDUs identified by Number of lost X2-U Sequence Number ranges reported, Start of lost X2-U Sequence Number range, and End of lost X2-U Sequence Number range are consecutive PDCP PDUs.

For example, if the SeNB 30 has lost the PDCP PDUs with the Sequence Numbers of PDCP PDU #3, PDCP PDU #7, PDCP PDU #10, PDCP PDU #11, and PDCP PDU #12, the SeNB 30 may describe each piece of information indicating that the PDCP PDU #3, PDCP PDU #7, PDCP PDU #10, PDCP PDU #11, PDCP PDU #12 have been lost in the X2-U Sequence Number #N and transmit it to the MeNB 20. Alternatively, the SeNB 30 may describe each piece of the information indicating that the PDCP PDU #3 and PDCP PDU #7 have been lost in the X2-U Sequence Number #N, describe the information that the PDCP PDU #10, PDCP PDU #11, and PDCP PDU #12 have been lost in Number of lost X2-U Sequence Number ranges reported, Start of lost X2-U Sequence Number range, and End of lost X2-U Sequence Number range, and then transmit them to the MeNB 20.

FIG. 20 shows an example of a format of the DL DATA DELIVERY STATUS.

SN Type of Octet1 indicates as to whether or not Sequence Numbers of PDCP PDUs, which have been lost by the SeNB 30, are consecutive.

For example, in SN Type of Octet1, 1 may indicate that the PDCP PDUs having the consecutive Sequence Numbers have been lost, while 0 may indicate that the PDCP PDUs having non-consecutive Sequence Numbers have been lost.

If SN Type indicates that the Sequence Numbers of the PDCP PDUs, which have been lost by the SeNB 30, are consecutive, it means that the PDCP PDUs identified by Number of lost X2-U Sequence Number ranges reported, Start of lost X2-U Sequence Number range, and End of lost X2-U Sequence Number range have been lost.

On the other hand, if SN Type indicates that the Sequence Numbers of the PDCP PDUs lost by the SeNB 30 are not consecutive, it means that the PDCP PDUs identified by the Sequence Numbers described in X2-U Sequence Number #1 to X2-U Sequence Number #N have been lost.

Like an example of the format of the DL DATA DELIVERY STATUS shown in FIG. 21, a discard result may be further included therein.

In the discard result of Octet1, 1 indicates that, in the format of the DL DATA DELIVERY STATUS shown in FIG. 21, the PDCP PDUs identified by the Sequence Numbers described in X2-U Sequence Number #1 to X2-U Sequence Number #N and the PDCP PDUs identified by Number of lost X2-U Sequence Number ranges reported, Start of lost X2-U Sequence Number range, and End of lost X2-U Sequence Number range have been lost.

The control unit 370 is a section that performs processes other than communication processing performed by the communication unit 360.

Note that the MeNB 20 can receive information transmitted from the communication unit 360 included in the SeNB 30.

This exemplary embodiment can solve the following problem. The DL DATA DELIVERY STATUS (PDU TYPE 1) Format examined by 3GPP can only express that PDCP PDUs having consecutive Sequence Numbers have been lost. Therefore, for example, when an SeNB transmits information indicating that the PDCP PDUs having the Sequence Numbers, PDCP PDU #3, PDCP PDU #7, PDCP PDU #10, PDCP PDU #11, and PDCP PDU #12 have been lost by the SeNB to an MeNB, the PDCP PDU #10, PDCP PDU #11, and PDCP PDU #12 can be expressed in one format. However, as the Sequence Numbers of the PDCP PDU #3 and PDCP PDU #7 are not consecutive, they need to be expressed in formats different from each other. However, as the Sequence Numbers of the PDCP PDU #3 and PDCP PDU #7 are not consecutive, they need to be expressed in formats different from each other. Accordingly, the SeNB needs to transmit, to the MeNB, the information indicating that the PDCP PDU #3 has been lost, the information indicating that the PDCP PDU #7 has been lost, and the information indicating that the PDCP PDU #10 to PDCP PDU #12 has been lost, thus leading to a problem that the number of signals between the MeNB and SeNB increases. The greater the number of PDCP PDUs lost, the more serious this problem becomes and the greater the number of signals generated. This problem needs to be solved because of a large signal load on the X2 interface caused thereby. In order to solve this problem, this exemplary embodiment enables the SeNB 30 to transmit, to the MeNB 20, information indicating that PDCP PDUs having consecutive Sequence Numbers and PDCP PDUs having non-consecutive Sequence Numbers have been lost or discarded by the SeNB 30 in one format.

Although the present invention has been described with reference to the exemplary embodiments, the present invention is not limited by the above exemplary embodiments. Various modifications and changes, understood by those skilled in the art, can be made to the configurations and details of the present invention within the scope of the invention.

In the operation of transmitting the discard command by the MeNB 20, which is described in the above exemplary embodiments, an individual E-RAB may be specified or an individual E-RAB may not be specified on the assumption that the U-plane protocol itself for carrying PDCP PDUs are specified for each E-RAB.

Further, the term "Sequence Number" of a PDCP PDU used in the present specification and claims may indicate, from time to time, a Sequence Number inside a PDCP PDU or a Sequence Number in U-Plane on the X2 interface that carries PDCP PDUs.

Furthermore, the term "discard" used in the present specification and claims may indicate, from time to time, abandon.

The present application is based upon and claims the benefit of priority from Japanese Patent Application No. 2014-227379, filed on Nov. 7, 2014, the entire contents of which are hereby incorporated by reference.

The whole or part of the exemplary embodiments disclosed above can be described as, but not limited to, the following supplementary notes.

[Supplementary Note 1]

A wireless communication system comprising:

a first base station; and a second base station configured to be capable of transmitting downlink data received from a core network to a terminal via the second base station and the first base station, wherein the second base station transmits, to the first base station, information for identifying downlink data to be discarded from among the downlink data transmitted to the first base station and a command for discarding the downlink data identified by the information, and the first base station discards downlink data not transmitted to the terminal from among the downlink data identified by the information.

[Supplementary Note 2]

The wireless communication system according to Supplementary Note 1, wherein the second base station does not specify downlink data in the information, and the first base station discards the downlink data not transmitted to the terminal from among the downlink data transmitted from the second base station to the first base station.

[Supplementary Note 3]

The wireless communication system according to Supplementary Note 1, wherein the second base station specifies a sequence number of the downlink data in the information, and the first base station discards downlink data not transmitted to the terminal from among the downlink data having the sequence number specified by the information.

[Supplementary Note 4]

The wireless communication system according to Supplementary Note 2 or 3, wherein the second base station specifies an individual E-RAB (EUTRAN-Radio Access Bearer, EUTRAN: Evolved UMTS Terrestrial Radio Access Network, UMTS: Universal Mobile Telecommunications System) in the information.

[Supplementary Note 5]

The wireless communication system according to Supplementary Note 1, wherein the second base station specifies QoS (Quality of Service) or QCI (QoS Class Identifier) of the downlink data in the information, and the first base station discards downlink data not transmitted to the terminal from among the downlink data having the QoS or QCI specified by the information.

[Supplementary Note 6]

The wireless communication system according to Supplementary Note 1, wherein the second base station specifies downlink data of GBR (Guarantee Bit Rate) or downlink data of Non-GBR, and the first base station discards downlink data not transmitted to the terminal from among the downlink data of the GBR or Non-GBR specified by the information.

[Supplementary Note 7]

The wireless communication system according to any one of Supplementary Notes 1 to 6, wherein the first base station transmits information for identifying the discarded downlink data to the second base station.

[Supplementary Note 8]

A base station configured to be capable of transmitting downlink data received from a core network to a terminal via the base station and an other base station, the base station comprising a communication unit configured to transmit, to the other base station, information for identifying downlink data to be discarded from among the downlink data transmitted to the other base station and a command for discarding the downlink data identified by the information.

[Supplementary Note 9]

A base station configured to be capable of receiving, from an other base station, downlink data received by the other base station from a core network and to be capable of transmitting the downlink data to a terminal, the base station comprising:

a communication unit configured to receive, from the other base station, information for identifying downlink data to be discarded from among the downlink data transmitted from the other base station to the base station and a command for discarding the downlink data identified by the information; and a control unit configured to discard downlink data not transmitted to the terminal from among the downlink data identified by the information.

[Supplementary Note 10]

A communication method performed by a base station configured to be capable of transmitting downlink data received from a core network to a terminal via the base station and an other base station, the communication method comprising transmitting, to the other base station, information for identifying downlink data to be discarded from among the downlink data transmitted to the other base station and a command for discarding the downlink data identified by the information.

[Supplementary Note 11]

A communication method performed by a base station configured to be capable of receiving, from an other base station, downlink data received by the other base station from a core network and to be capable of transmitting the downlink data to a terminal, the communication method comprising:

receiving, from the other base station, information for identifying downlink data to be discarded from among the downlink data transmitted from the other base station to the base station and a command for discarding the downlink data identified by the information; and discarding downlink data not transmitted to the terminal from among the downlink data identified by the information.

[Supplementary Note 12]

A master base station in a dual connectivity system comprising:

a receiver configured to receive a PDCP PDU from a core network; and a transmitter configured to transmit the PDCP PDU to a secondary base station in the dual connectivity system and transmit the PDCP PDU to a terminal via MCG bearer.

[Supplementary Note 13]

A method for a master base station in a dual connectivity system comprising:

receiving a PDCP PDU from a core network;

transmitting the PDCP PDU to a secondary base station in the dual connectivity system; and transmitting the PDCP PDU to a terminal via MCG bearer.

REFERENCE SIGNS LIST

10 UE
20 MeNB
21 COMMUNICATION UNIT
30 SeNB
31 COMMUNICATION UNIT
32 CONTROL UNIT
40 MME
50 S-GW
101 COMMUNICATION UNIT
102 CONTROL UNIT
320 COMMUNICATION UNIT
330 CONTROL UNIT
360 COMMUNICATION UNIT
370 CONTROL UNIT

What is claimed is:

1. A secondary base station of a dual connectivity which includes the secondary base station and a master base station, the secondary base station comprising:

a memory; and a processor configured to:

receive a downlink (DL) USER DATA from the master base station, the DL USER DATA including first information, second information and third information;

wherein the first information indicates a starting sequence number of a Packet Data Convergence Protocol Data Unit (PDCP PDU) to be discarded, wherein the second information indicates the number of PDCP PDU counted from the starting Sequence Number indicated by the first information, wherein if the third information indicates 1, the third information indicates to discard PDCP PDU indicated by the first information and the second information.

2. A method performed by a secondary base station of a dual connectivity which includes the secondary base station and a master base station, the method comprising:

receiving a downlink (DL) USER DATA from the master base station, the DL USER DATA including first information, second information and third information;

wherein the first information indicates a starting sequence number of a Packet Data Convergence Protocol Data Unit (PDCP PDU) to be discarded, wherein the second information indicates the number of PDCP PDU counted from the starting Sequence Number indicated by the first information, wherein if the third information indicates 1, the third information indicates to discard PDCP PDU indicated by the first information and the second information.

* * * * *